(12) United States Patent
K et al.

(10) Patent No.: US 10,870,497 B2
(45) Date of Patent: Dec. 22, 2020

(54) APPARATUS AND METHOD FOR SELECTIVELY ENABLING VEHICLE FUNCTIONALITY

(71) Applicant: Honeywell International Inc., Morris Plains, NJ (US)

(72) Inventors: Nathan K, Bangalore (IN); Sreenivasan Govindillam K, Bengaluru (IN)

(73) Assignee: Honeywell International Inc., Charlotte, NC (US)

(*) Notice: Subject to any disclaimer, the term of this patent is extended or adjusted under 35 U.S.C. 154(b) by 318 days.

(21) Appl. No.: 15/892,583

(22) Filed: Feb. 9, 2018

(65) Prior Publication Data
US 2019/0248504 A1 Aug. 15, 2019

(51) Int. Cl.
*B64D 43/00* (2006.01)
*G06Q 30/04* (2012.01)
*B64D 45/00* (2006.01)

(52) U.S. Cl.
CPC ............ *B64D 43/00* (2013.01); *G06Q 30/04* (2013.01); *B64D 2045/0075* (2013.01)

(58) Field of Classification Search
None
See application file for complete search history.

(56) References Cited

U.S. PATENT DOCUMENTS

| 8,862,286 | B2 | 10/2014 | Stassen et al. |
| 9,466,212 | B1* | 10/2016 | Stumphauzer, II ......... G08G 1/09675 |
| 9,731,815 | B2 | 8/2017 | Pangilinan et al. |
| 2008/0174472 | A1 | 7/2008 | Stone et al. |
| 2011/0001638 | A1* | 1/2011 | Pudar ............... G08G 1/20 340/988 |
| 2017/0186328 | A1 | 6/2017 | Beernaert |
| 2018/0182252 | A1* | 6/2018 | Govindillam K .... G06Q 20/102 |

OTHER PUBLICATIONS

Garmin; Integrated Flight Deck Solutions; pp. 1-10; Publisher Garmin International, Inc.; "www.Garmin.com/aviation"; Published in Olathe, KS.

* cited by examiner

*Primary Examiner* — Lail A Kleinman
(74) *Attorney, Agent, or Firm* — Bookoff McAndrews, PLLC

(57) ABSTRACT

A method is provided. The method comprises receiving a travel plan for a vehicle including a travel path information; determining a vehicle trajectory using the travel path information; obtaining forecasts of at least one of weather and vehicles proximate in time and location to the vehicle along the vehicle trajectory; determining, based upon at least one of the weather forecast and the other vehicles forecast, if at least one optional function would be beneficial to enable during vehicle travel along the vehicle trajectory; and generating at least one enablement code corresponding to the determined at least one optional function.

20 Claims, 5 Drawing Sheets

APPARATUS AND METHOD FOR SELECTIVELY ENABLING VEHICLE FUNCTIONALITY

BACKGROUND

Modern aircraft avionics systems offer a sophisticated and expansive suite of control, monitoring, and processing functions which can be used during aircraft flight. The control, monitoring, and processing functions can be uniquely specified in a system configuration module (or 'aircraft personality module') that is part of the aircraft avionics system. Thus, avionics system manufacturers can manufacture a single system but customize an enabled subset of the available features through programming the system configuration module.

However, depending on circumstances, for some aircraft flights it may be beneficial to enable other functionality for just those flights. Manually determining which functions to enable, and manually enabling the functions is time consuming, and not easily done. Not only would personnel need to determine which functions to enable, but would have to modify, e.g. an aircraft personality module, to enable such functions. Typically, this would have to be accomplished when an aircraft is disembarking and embarking passengers and/or cargo. Therefore, there is a need to more efficiently determine additional functionality to enable, and to enable such functionality.

SUMMARY

A method is provided. The method comprises receiving a travel plan for a vehicle including a travel path information; determining a vehicle trajectory using the travel path information; obtaining forecasts of at least one of weather and vehicles proximate in time and location to the vehicle along the vehicle trajectory; determining, based upon at least one of the weather forecast and the other vehicles forecast, if at least one optional function would be beneficial to enable during vehicle travel along the vehicle trajectory; and generating at least one enablement code corresponding to the determined at least one optional function.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
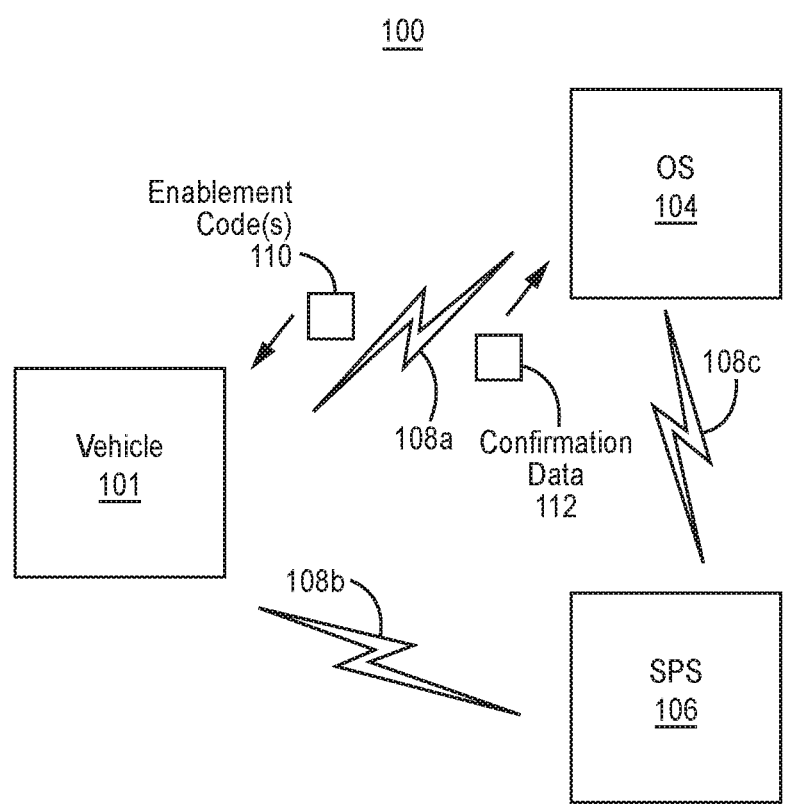
FIG. 1 illustrates a block diagram of one embodiment of a system that includes a vehicle with at least one optional function that can be selectively enabled.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A processing system, on a vehicle and coupled to a communications system on the vehicle, used to enable one or more optional functions (optional function(s)) in systems on the vehicle may be used to overcome the above referenced problems. The vehicle's processing system may be a travel, e.g. flight, computer and/or any other processing system(s) on the vehicle. The embodiments of the invention have at least one advantage. Optional function(s) can be automatically selected and enabled based upon a vehicle trajectory (which shall be subsequently described).

Enable and enabled utilized with respect to an optional function shall mean that the optional function, depending upon context, is, has been, or may or will be activated so that it can be used, but does not necessarily mean that the optional function is, has been, or may or will be used. Use and used utilized with respect to an optional function shall mean that the optional function, depending upon context, is, has been, or may or will be utilized, but only after the optional function has been enabled. Optionally, optional function(s) can be remotely enabled, e.g. by a service provider system.

In one embodiment, the vehicle's processing system, or even another processing system, such as portable computing system such as an electronic flight bag, that is not part of the vehicle, is used, e.g. by an vehicle user, e.g. a pilot or driver, or vehicle owner, such as an airline, to submit travel plan information, including travel path information, about forthcoming travel of the vehicle. In another embodiment, the vehicle travel plan is provided by the owner or user of the vehicle prior to the vehicle's departure. The travel plan is directly or indirectly conveyed to a service provider system and/or the vehicle processing system. In one embodiment, the travel plan information is submitted to a service provider such as Honeywell International Inc.'s GoDirect Flight Services system.

Optionally, the vehicle travel plan is also provided by the above described means to governmental entities of the regions and/or countries where the vehicle will be travelling. For example, when the vehicle is an aircraft, the airline or pilot submits the vehicle travel plan, i.e. an aircraft flight plan, to governmental entities, e.g. the U.S. Federal Aviation Administration (FAA), of the regions and/or countries over which the aircraft will travel.

In one embodiment, each vehicle travel plan includes an identifier of the vehicle, information about the vehicle (e.g. manufacturer and type of vehicle, color and any special equipment on the vehicle), expected speed of the vehicle, departure location (or departure terminal) and time, travel path information (e.g. for aircraft: cruising altitude, airways, and waypoints), and arrival location(s) (or destination(s) or terminal(s)) and time, estimated time en route, fuel on board, alternate arrival locations (or destination(s) or terminal(s)) in case of inclement weather, type of travel (e.g. for aircraft: whether instrument flight rules (IFR) or visual flight rules (VFR) apply), information (e.g. name) about the user (e.g. pilot) and/or owner of the vehicle (e.g. pilot), and number of people on board the vehicle. The term 'travel information' shall mean the expected speed of the vehicle, the departure location (or departure terminal) and time, the travel path information (e.g. for aircraft: cruising altitude, airways, and waypoints), the arrival location(s) (or destination(s) or terminal(s)) and time, estimated time en route, and fuel on board.

The service provider system or the vehicle processing system obtains information about weather and other vehicle traffic proximate to when and where the vehicle will be travelling along its vehicle trajectory; as will be described below the vehicle trajectory is determined from the vehicle's travel path information. Based upon this information, the service provider system or vehicle processing system may identify optional function(s) to be enabled. If optional function(s) to be enabled are identified, the service provider system transmits to the vehicle, e.g. the vehicle processing system, at least one enablement code(s). Enablement code, as used herein, means data configured to enable at least one optional function on systems on the vehicle. Alternatively, the vehicle processing system generates, or obtains from a service provider system, such enablement code(s). Optionally, the enablement code(s) are communicated, e.g. over a data bus in the vehicle to corresponding systems to enable the optional function(s). Once enabled, the optional function(s) can be used by the crew and/or systems of the vehicle.

Using such as system, optional function(s) can be enabled only when needed during the travel of the vehicle, e.g. for finite periods of time for example when travelling between a departure location and an arrival location. As a result, the vehicle, e.g. avionics, system manufacturers can reduce the initial system cost, and charge for optional function(s) on a usage basis only when the optional function(s) are enabled and/or used. As a result, owners and/or users of vehicles, such as aircraft, can initially more readily afford feature rich avionics equipment which would improve their vehicles' efficiency and safety. Although the present invention is exemplified as being used in an aircraft, it is envisioned that it can be used in other vehicles including without limitation automobiles, buses, trains, and any other vehicle.

FIG. 1 illustrates a block diagram of one embodiment of a system 100 that includes a vehicle with at least one optional function that can be selectively enabled (vehicle) 101. The system further includes at least one operations system (operations system(s) or OS) 104 and a service provider system (SPS) 106. In another embodiment, the vehicle 101, operations system(s) 104, and the service provider system 106 are interconnected by respective communications links 108a, 108b, 108c. The operations system 104 and the service provider system 106 may each be alternatively referred to as a remote system.

In yet another embodiment, at least one first communications link (first communications link(s)) 108a and a second communications link 108b communicatively couple the vehicle 101 respectively to the operations system(s) 104 and the service provider system 106. At least one third communications link (third communications link(s)) 108c couples the operation system(s) 104 to the service provider system(s) 106.

Each of the first communications link(s) 108a, the second communications link 108b, and the third communications link(s) 108c includes wireless and/or wired communications links. A wireless network, e.g., permits communications to a moving or stationary vehicle 101 when a wired connection is impractical. Such wireless communications networks may be formed, for example, by one or more of HF, VHF, cellular, satellite, IEEE802.11 compliant, AeroMACs, WiMAX, and/or any other appropriate wireless communications network(s). In a further embodiment, the operations system(s) 104 and the service provider system 106 may be connected by one or more communications links (communications link(s)) 108a including wireless and/or wired networks. An example of a wired network is the Internet, although other wired networks such as dedicated T-carrier lines can be used.

Optionally, as will be further described below, the operations system 104 transmits at least one enablement code (enablement code(s)) 110 to the vehicle 101. Such enablement code(s) 110 facilitate remotely enabling at least one optional function (optional function(s)) in the vehicle 101. In one embodiment, the enablement code(s) 110 may only enable one corresponding function. In another embodiment, an enablement code 110 may enable more than one function. In a further embodiment, such enablement code(s) 110 can be encrypted. In a further embodiment, such encrypted enablement code(s) are decrypted in equipment in the vehicle 101 becoming decrypted enablement code(s), or enablement code(s). In yet another embodiment, as will be further described below, the vehicle 101 transmits confirmation data 112 to the service provider system 106. The confirmation data 112 indicates which optional function(s), enabled with enablement codes, were used during travel of the vehicle 101 from a departure point to a destination point. For aircraft, the departure point and destination point would be airports.

Figure 2:
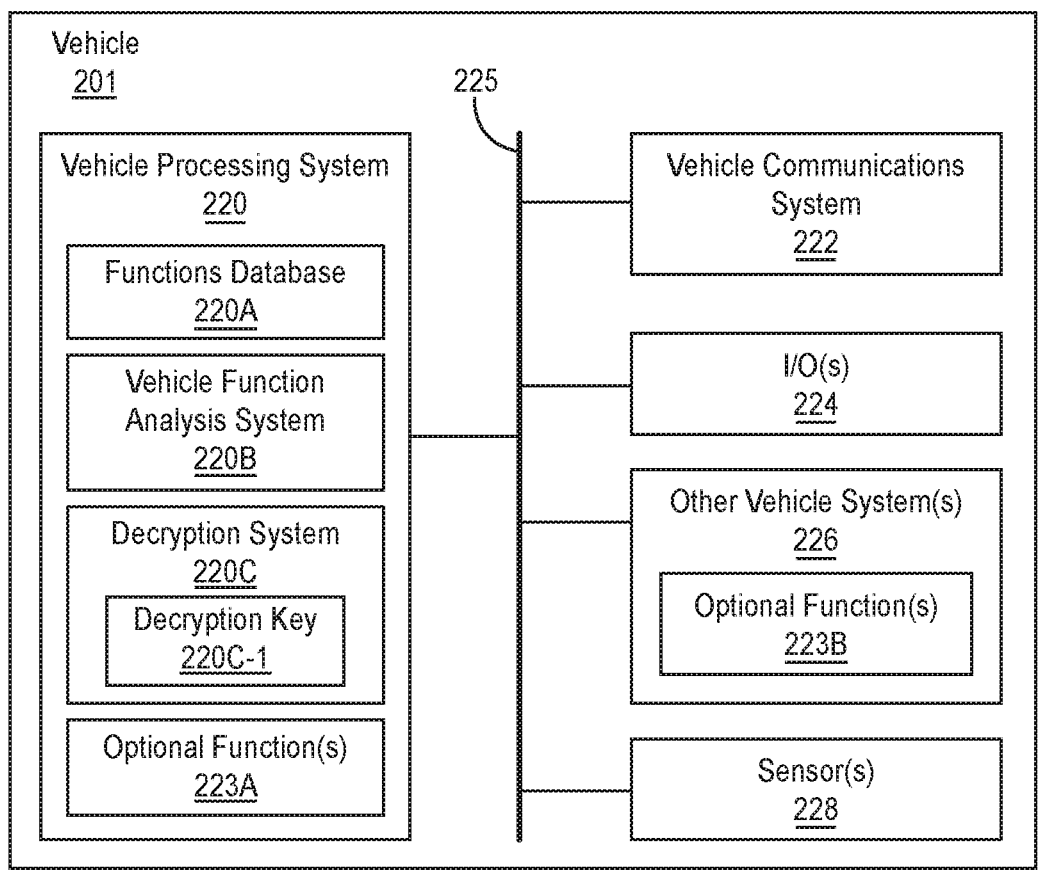
FIG. 2 illustrates a block diagram of one embodiment of the vehicle that includes at least one optional function that can be selectively enabled.

FIG. 2 illustrates a block diagram of one embodiment of the vehicle 201 that has at least one optional function that can be selectively enabled. The vehicle 201 includes a vehicle processing system 220 coupled to a vehicle communications system 222 and other vehicle system(s) 226. Optionally, the vehicle processing system 220 is coupled to at least one input/output system (I/O(s)) 224. Optionally, the vehicle processing system 220 is coupled to at least one sensor (sensor(s)) 228. In one embodiment, the vehicle processing system 220 may be the vehicle computer, e.g. a flight computer. Optionally, the vehicle processing system 220, vehicle communications system 222, other vehicle system(s) 226, I/O(s) 224, and/or the sensor(s) 228 are coupled to one another through the one or more data buses (data bus(es)) 225.

The vehicle communications system 222 includes wireless communications system(s). The wireless communications systems may include, for example one or more of HF, VHF, cellular, satellite, IEEE802.11 compliant, AeroMACS, WiMAX, and/or any other appropriate wireless communications system(s).

Optional function(s) 223A, 223B, which will be subsequently exemplified, that may be remotely enabled are located in the other vehicle system(s) 226 and/or the vehicle processing system 220. In one embodiment, for aircraft, the other vehicle system(s) 226 include a flight management system used to determine and maintain the trajectory of the vehicle 201 from its departure point to its destination point, an electronic flight instrument system used to determine and/or display flight parameters such as altitude and environmental data, a synthetic vision system used to generate a simulated view from the cockpit of the vehicle 201, and/or an airport moving map system. The synthetic vision system generates an electronic image that is a two dimensional rendering of a three dimensional view of what the pilot should see, e.g. terrain, structures, and runways, from the cockpit, and is useful in bad weather. The airport moving map system visually illustrates runways, taxi ways, airport structures, and signs a various airports which can aid departure and arrival at an airport; the visual illustration may be a two dimensional view or a three dimensional rendering, e.g. using the synthetic vision system. The synthetic vision system and/or moving map are displayed on at least one dedicated display that is part of at least one of those systems, or on a display that is part of the I/O(s) 224.

The vehicle communications system 220 is used to transmit and receive data, e.g., respectively to and from operations system(s) 104, the service provider system 106, or other vehicles. In one embodiment, the vehicle communications system 220 is one or more wireless communications systems such as HF, VHF, satellite communication, cellular radio transceivers, and/or other communications systems. Optionally, enablement code(s) 110 are communicated from the service provider system 106 to the vehicle communications system 220. In such an embodiment, the vehicle communications system 220 distributes the enablement code(s) 110 directly, over the data bus(es) 225, to the other vehicle system(s) 226 and/or the vehicle processing system 220 having optional function(s) 223A, 223B to be enabled. Alternatively, the enablement code(s) 110 are routed through the vehicle processing system 220, e.g. then to the other vehicle system(s) 226 to enable optional function(s) in those other vehicle system(s) 226; such routing can also be performed over the data bus(es) 225. In one embodiment, the data bus(es) 225 is at least one ARINC 429 data bus.

The I/O(s) 224 facilitate inputting and outputting, e.g. displaying, data respectively to and from the vehicle processing system 220, other vehicle system(s) 226), the vehicle communications system 222, and/or the sensor(s) 228. The I/O(s) 224 may include one or more of display(s) (such as a touch screen display), cursor control device(s) (such as mouse or a joy stick), a key board, and any other type of input/output device.

The sensor(s) 228 provide environmental information, and may include one or more of a weather RADAR, an automatic dependence surveillance (ADS receiver) such as an ADS-B receiver that receives information about proximate aircraft and weather, a radar altimeter, an aneroid barometer, a pitot tube, a GPS system, a temperature sensor, and sensor.

The vehicle processing system 220 is implemented as a state machine. In one embodiment, the vehicle processing system 220 may be implemented with one or more processors coupled to one or more memories.

In one embodiment, the vehicle processing system 220 includes a functions database 220A which includes a list of optional function(s) in the vehicle which can be, e.g. remotely, enabled and disabled. In one embodiment, the functions database 220A is stored in one or more memories of the vehicle processing system 220. The functions database 212 includes a list of optional function(s) of the vehicle processing system 220 and/or the other vehicle system(s) 226. Database as used herein means a conventional database, data files, or any other data storage scheme.

The vehicle processing system 220 includes a vehicle function analysis system 220B. During travel of the vehicle 201 between a departure point and a destination point, the systems with optional function(s) communicate with the vehicle function analysis system 220B identifying which enabled functions have been used by the vehicle crew and/or vehicle systems during such travel. If an optional function is enabled and/or used during the travel of the vehicle 101 between a departure point and a destination point, the vehicle function analysis system 220B modifies the vehicle database 220A to indicate such enablement and usage. Upon arriving at a destination point, if at least one optional function has been enabled and used, the vehicle function analysis system 220B transmits, through the vehicle communications system 222 to the service provider system 106, information, e.g. vehicle identifier (e.g. aircraft tail number, departure time, arrival time, and/or functions enabled and/or used. Optionally, the vehicle function analysis system 220B receive enablement code(s) 110 from the service provider system 106 and distributes them to the corresponding vehicle system; optionally in this embodiment, the functions database may include information, such as the enablement code(s) and corresponding systems, that assists the vehicle function analysis system 220B to distribute the enablement code(s) 110 to the appropriate vehicle system(s).

Optionally, the vehicle function analysis system 220B ascertains, rather then a service provider system 106, based on weather and traffic information which optional function(s) on the vehicle 201 is beneficial to be enabled based upon weather and traffic conditions along the vehicle trajectory. Beneficial means that it enhances the safety of the vehicle 201, eases the work load of the vehicle crew, and/or improves the quality of travel for the passengers and/or crew of the vehicle 201. The vehicle function analysis system 220B obtains the weather and traffic information from operations system(s) 104, as described above, and/or the service provider system 106 (which may have obtained such information from the operations system(s) 104 and/or from other vehicle(s)). In one embodiment, weather and traffic information, and travel plan information, e.g. travel path information, may be stored in one or more databases in the vehicle processing system 220. An exemplary technique for the implementation of the function analysis system is illustrated below.

In one embodiment, the vehicle function analysis system 220B or the functions database 220A include the enablement code(s) 110. In the latter case, the vehicle function analysis system 220B obtains the enablement code(s) 110 from the functions database 220A. The vehicle function analysis system 220B can transmit the enablement code(s) 110 to vehicle systems to enable optional function(s) that it determines is beneficial to be enabled based upon the weather and/or traffic data. Alternatively, the vehicle function analysis system 220B requests and obtains the enablement code(s) 110 from a service provider center 106.

Optionally, the vehicle processing system 210 includes a decryption system 220C. The decryption system 220C decrypts encrypted enablement codes sent to the vehicle 101, e.g. by a service provider system 106, to remotely enable one or more optional functions on the vehicle 201. In one embodiment, the decryption system 220C includes a decryption key 220C-1 used to decrypt encrypted activation code(s). The decryption system 220C can be implemented in software, hardware, or a combination thereof.

Figure 3:
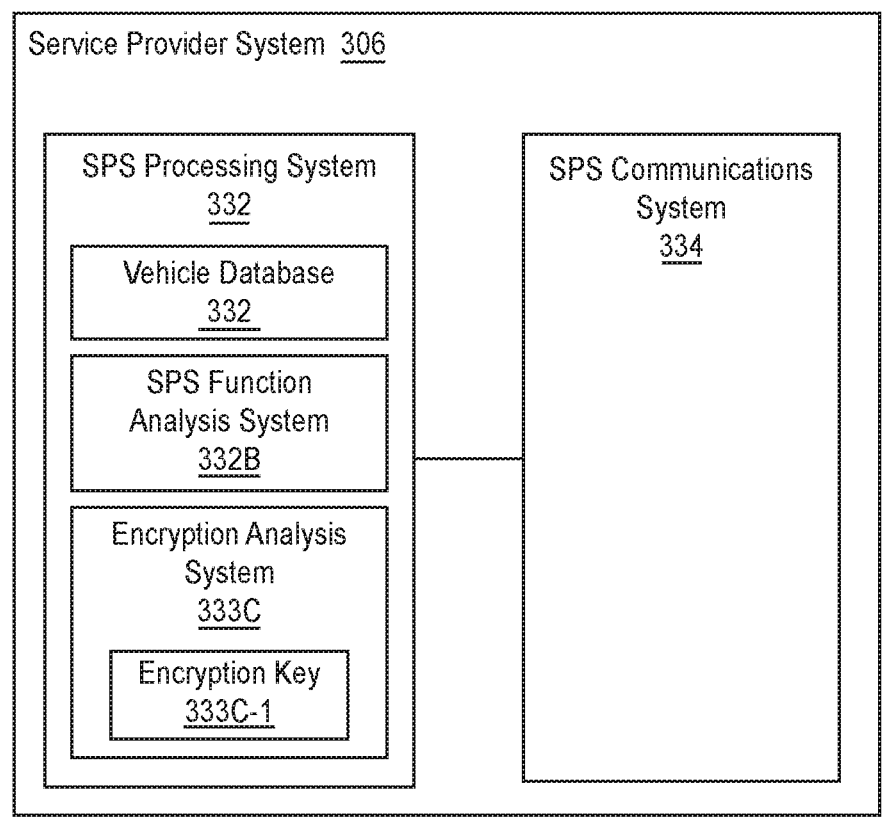
FIG. 3 illustrates a block diagram of one embodiment of a service provider system.

FIG. 3 illustrates a block diagram of one embodiment of a service provider system 306. In the illustrated embodiment, the service provider system 306 comprises a service provider system processing system 332 coupled to a service provider (SP) communications system 334. The service provider processing system 322 is implemented as a state machine. In one embodiment, the service provider processing system 322 may be implemented with one or more processors coupled to one or more memories.

The service provider communications system 334 includes wireless and/or wired communications systems. The wireless communications systems may include, for example, one or more of HF, VHF, cellular, satellite, IEEE802.11 compliant, AeroMACS, WiMAX, and/or any other appropriate wireless communications system(s). An example of a wired network is the Internet, although other wired networks such as dedicated T-carrier lines can be used.

In one embodiment, the service provider processing system 332 includes a vehicle database 322A which includes a list of optional functions, for each of one or more vehicles, which can be remotely enabled and disabled. In one embodiment, the vehicle database 322A is stored in one or more memories of the service provider processing system 322A. The vehicle database 322A includes a list of optional functions for each vehicle.

The service provider processing system 332 includes a service provider function analysis system 322B. In one embodiment, the service provider vehicle function analysis system 322B ascertains, rather then the vehicle function analysis system 220B, based on weather and traffic information which optional functions on the vehicle 101 is beneficial to be enabled based upon weather and traffic conditions along the vehicle trajectory of the vehicle 101. The service provider function analysis system 322B obtains the weather and traffic information from operations system(s) 104, as described above and/or from other vehicle(s)). In another embodiment, weather and traffic information, and travel plan information, e.g. travel path information, for each vehicle may be stored in one or more databases in the service provider processing system 220, including for example the vehicle database 332. An exemplary technique for the implementation of the service provider function analysis system 322B is illustrated below.

In one embodiment, the service provider function analysis system 322B or vehicle database 332A includes enablement code(s) 110. In the latter case, the service provider function analysis system 322B obtains the enablement code(s) 110 from the vehicle database 322A. The service provider function analysis system 322B transmits, through the service provider communications system 334, the enablement code(s) 110 to the corresponding vehicle to permit the vehicle to enable optional functions that the service provider function analysis system 322 determined is beneficial to be enabled based upon the weather and/or traffic data.

Alternatively, the service provider function analysis system 322B receives requests for enablement code(s) 110 from vehicle(s), e.g. from a vehicle function analysis system(s) 220B on vehicle(s), to enable optional function(s) specified in the requests. The service provider function analysis system 322B confirms whether the specified optional function(s) are in the functions database 220A. Upon successful confirmation of some or all of the optional function(s), the service provider function analysis system 322B transmits, through the service provider communications system 334, the enablement code(s) 110 to the corresponding vehicle to permit the vehicle to enable optional functions. Optionally, if confirmation of at least one optional function is unsuccessful, the service provider function analysis system 322B transmits, through the service provider communications system 334, data indicating that such optional function(s) were not confirmed, thus indicating that no enablement code(s) would be transmitted for such function(s).

Optionally, the service provider processing system 332 includes an encryption system 332C. The encryption system 332C encrypts enablement codes to be sent to a vehicle 101. In one embodiment, the encryption system 332C includes an encryption key 333C-1 used to encrypt an activation code. The encryption system 322C can be implemented in software, hardware, or a combination thereof.

Figure 4:
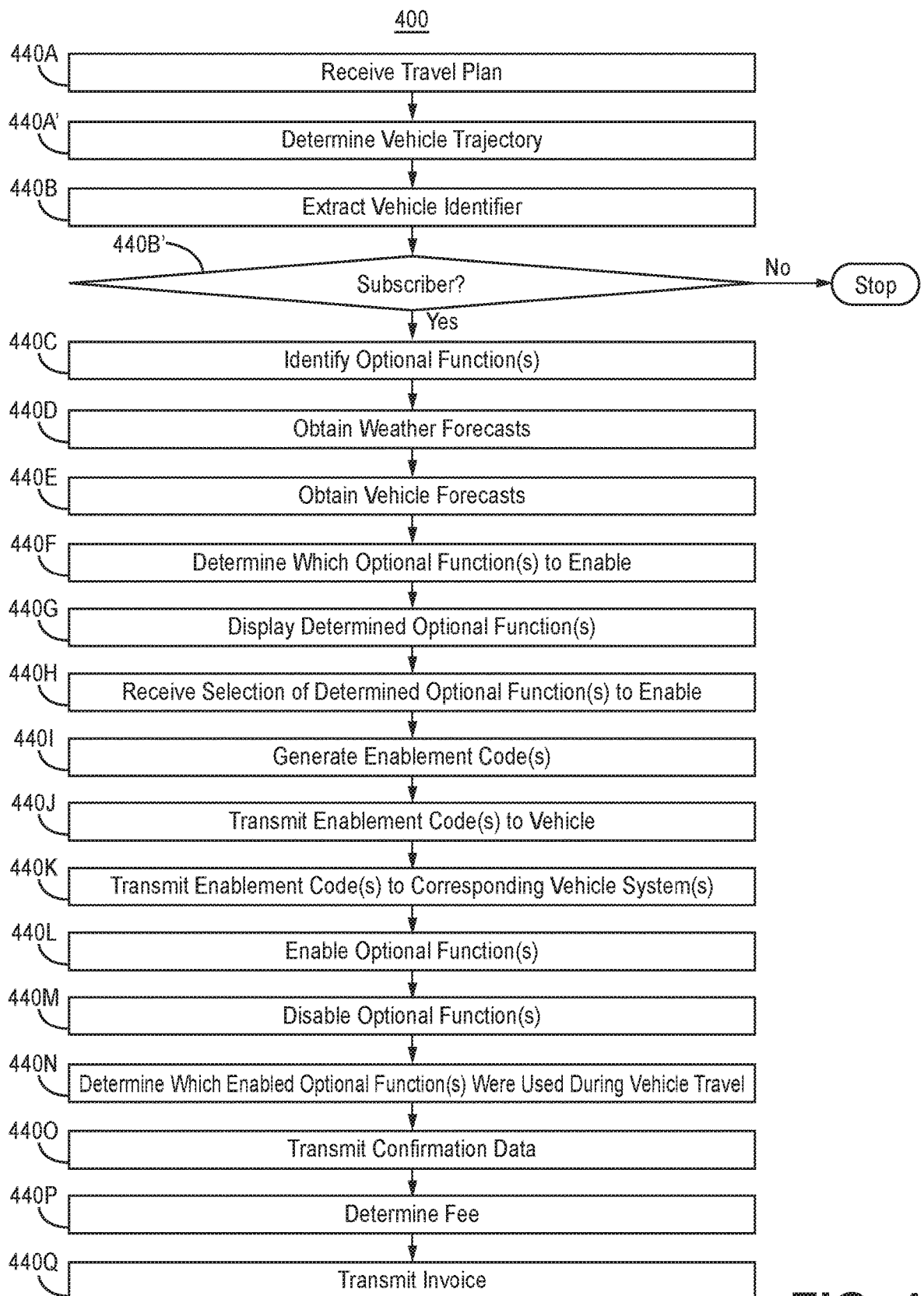
FIG. 4 illustrates a flow diagram of one embodiment of a method for selectively enabling optional functions on a vehicle.

Exemplary operation of enabling optional functionality in vehicle systems will now be described. FIG. 4 illustrates a flow diagram of one embodiment of a method 400 for selectively enabling optional functions on a vehicle. For pedagogical purposes, FIG. 4 is described in terms of remotely enabling optional functions in an aircraft (more generally illustrated above as a vehicle 101). However, it is understood that the teachings of FIG. 4 are applicable to other types of vehicles as discussed above.

To the extent that the embodiment of method 400 shown in FIG. 4 is described herein as being implemented in the systems shown in FIGS. 1 through 3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440A, receive travel plan, e.g. from crew or user (e.g. pilot) of a vehicle 101, at either the service provider system 306 or the vehicle processing system 220. The travel plan can be provided directly to either system, or received indirectly such as through operations center(s) 104 such as the FAA's System Wide Information Management (SWIM) system. The travel plan includes travel path information such as the vehicle's time of departure and arrival, departure point, destination point, and any way points in between. The travel plan includes other information, such as a vehicle identifier, as further described elsewhere herein.

In block 440A', determine a trajectory of a vehicle, or vehicle trajectory. The vehicle trajectory is a detailed three-dimensional position of the vehicle with respect to time. In another embodiment, the vehicle trajectory is generated by a processing system, e.g. by the vehicle processing system 220 and/or the SPS processing system 332, by using the vehicle travel plan, e.g. the travel path information, and a vehicle performance database for the corresponding vehicle, to determine the vehicle's trajectory. The vehicle performance database comprises characteristics of the vehicle which may include, for example for an aircraft, range, gross and empty weight, rate of climb, fuel capacity, maximum speed, fuel burn rate, ground roll at takeoff and landing, and typical indicated airspeed or true airspeed, e.g. at different flight levels. The vehicle trajectory can be used then to determine if and where the vehicle will be proximate to other vehicles, darkness e.g. due to night time, and/or weather, e.g. fog, cloud cover, temperature and/or severe weather, along the vehicle trajectory.

Optionally, a trajectory for each of the other vehicles can analogously determined by a processing system, e.g. the vehicle processing system 220 or the SPS processing system 332, by using the travel plan, e.g. the travel path information, of each of the other vehicles and a vehicle performance database for each of the other vehicles. The trajectories of the vehicle and the other vehicles can be used to determine if and where the vehicle is proximate to other vehicles.

Optionally, in block 440B, extract the vehicle identifier from the travel plan if function enablement analysis is being performed by a service provider system. Optionally, also obtain information about vehicle user (e.g. pilot) and/or owner.

Optionally, in block 440B', determine if the vehicle, vehicle user, and/or vehicle owner is subscriber to a service, e.g. of a service provider, that permits selective enablement of optional functions in equipment on the vehicle. If no, then halt further processing. If yes, then continue as follows.

Optionally, in block 440C, identify, based upon the vehicle identifier, optional function(s) on the vehicle 101 which can be enabled by a function analysis system, e.g. using a vehicle database 332A at the service provider system 306 or a functions database 220A on the vehicle 101. Optionally, in block 440D, obtain forecasts of weather proximate in both time and location along the vehicle trajectory. Such information can be obtained from operations system(s) 104, such as the National Digital Forecast Database of the U.S. National Weather Service, from other vehicles (such as through the U.S. FAA's SWIM system), or from the sensor(s) 228, such as weather RADAR, on the vehicle 101.

Optionally, in block 440E, obtain forecasts of other vehicles, e.g. aircraft, proximate in both time and location along the vehicle trajectory. Such information can be obtained from operations system(s) 104, such as the U.S. FAA's SWIM system. For purposes of clarity, only at least one of blocks 440D and 440E need be performed. However, alternatively, both blocks can be performed.

In block 440F, determine which optional function(s) to enable, e.g. based upon at least one of the weather forecast and traffic forecast proximate in both time and location to the vehicle trajectory, and/or base upon the departure and/or destination points of the vehicle. Examples of how to do so will be subsequently illustrated. In block 440G, optionally, display, e.g. on the I/O(s) 224 such as a touch screen display, the determined optional function(s). In block 440H, optionally, receive selection, e.g. from a vehicle crew, as to which determined optional function(s) to enable.

In block 440I, generate enablement code(s), e.g. for all determined optional function(s) or only determined optional function(s) that were selected. In block 440J, optionally, transmit enablement code(s) to the vehicle, e.g. from the service provider system; in one embodiment, the transmitted enablement code(s) are received by the vehicle. In another embodiment, the enablement code(s) are encrypted before transmission, and decrypted upon reception.

Optionally, in block 440K, transmit enablement code(s), e.g. from a service provider system or from a vehicle processing system to corresponding vehicle system(s). The corresponding vehicle system(s) are the system(s) in the vehicle that incorporate the optional function(s). In one embodiment, route, e.g. from the vehicle communications system 222 or the vehicle processing system 220 over data bus(es), to the enablement code(s) to the corresponding vehicle systems.

In block 440L, enable optional function(s) in vehicle system(s) corresponding to the enablement code(s), e.g. before departure from the destination point and/or during vehicle travel along its vehicle trajectory. In one embodiment, at least one of the enabled optional function(s) is used on the vehicle. Blocks 440D through 440L may be repeated during the course of travel of a vehicle 101 from its departure point to its destination point.

In block 440M, disable enabled optional function(s) when the vehicle has concluded its travel along the vehicle trajectory. This can be done based upon input of, e.g. the pilot, or based upon vehicle equipment such as a sensor, e.g. a global satellite navigation receiver, and navigation system that determine that travel has ended. In block 440N, optionally, determine which enabled optional function(s) were used during vehicle travel. The list of optional function(s) enabled and/or used during travel along the vehicle trajectory can be implemented by feedback from the vehicle systems incorporating the enabled optional functions to the vehicle processing system 220; such feedback can be stored in the functions database 220A.

In block 440O, optionally, transmit confirmation data 102 from the vehicle 101, e.g. to the service provider center 106. Confirmation data 102 identifies the optional functions enabled and/or used during travel of the vehicle 101 between a departure point and a destination point. In block 440P, determine a fee to charge the owner or user of the vehicle for the use of the optional functions. In block 440P, transmit invoice for the fee, e.g., to the vehicle owner or user for the optional functions enabled and/or used. In another embodiment, the invoicing can be undertaken electronically, i.e. through e-billing.

Figure 5:
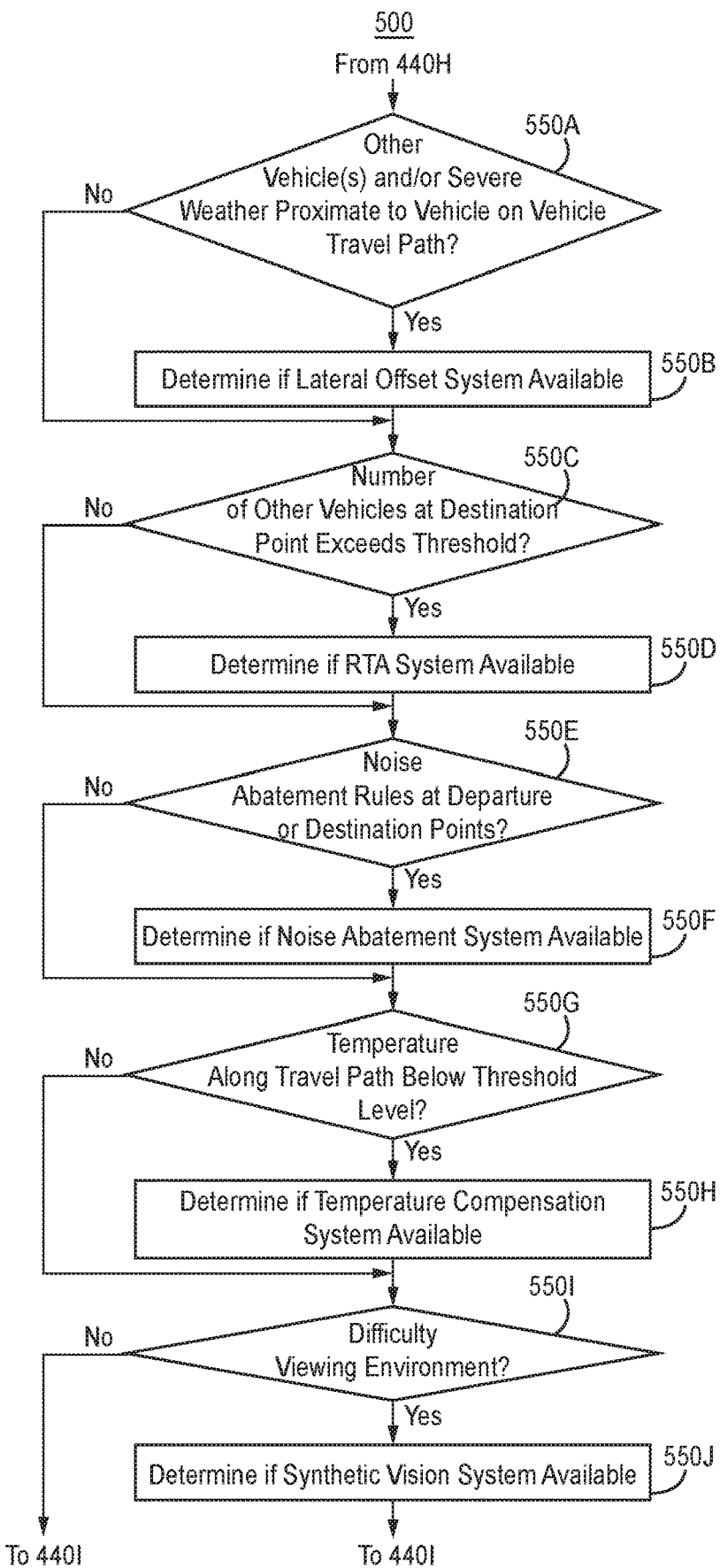
FIG. 5 illustrates a flow diagram of one embodiment of a method of determining which optional function(s) to selectively enable.

Examples of block 440F will now be described. FIG. 5 illustrates a flow diagram of one embodiment of a method 500 of determining which optional function(s) to selectively enable. To the extent that the embodiment of methods 500 shown in FIG. 5 is described herein as being implemented in the systems shown in FIGS. 1 through 3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). Some, none or all of the following examples may be utilized in performing block 440F.

In block 550A, determine if, before the destination point, other vehicles and/or severe weather will be proximate in both time and location to the vehicle on vehicle trajectory. Severe weather is weather such as turbulence, lighting, and icing that, e.g., pilots of an aircraft would normally avoid.

If the answer to the inquiry of block 550A is yes, then optionally, in block 550B, determine if a lateral offset system is an optional function that can be enabled, e.g. specified in the functions database or the vehicle database. The lateral offset system modifies a portion of the vehicle trajectory—in the latitudinal and longitudinal axes but not the latitudinal axis—to avoid proximate other aircraft or severe weather. If yes, then in block 440I, generate an enablement code for the lateral offset optional function, e.g. in the vehicle or flight management system. The second blocks in this and the following sets of two blocks are optional. Alternatively, it is known in advance which optional function(s) are available on a particular vehicle, e.g. through a database, and thus only the first block (or its equivalent) is performed in such a case.

In block 550C, determine if at the destination point, the number of other vehicles proximate in time to the arrival of the vehicle at the destination point will exceed a threshold level. The threshold level may be determined, on a destination point by destination point basis, by, e.g. a pilot, of the vehicle, a designer of the system to remotely enable system functionality, or another source of information. If yes, then in block 550D, determine if a requested time of arrival (RTA) system is an optional function that can be enabled, e.g. specified in the functions database 220A or the vehicle database 322A. The RTA system selects an arrival time to a way point or the destination point so that the vehicle arrives at the destination point when it is less crowded, i.e. having a number of other vehicles proximate in time and location at the destination point equal to or less than the threshold level. Optionally, the RTA system requests that a vehicle traffic control center approve the selected arrival time. If yes, then in block 440I, generate an enablement code for the RTA system optional function, e.g. in the vehicle or flight management system.

Other optional functions dependent upon the destination point include an airport moving map, and would be implemented analogously as described above. That is if the corresponding vehicle system includes an airport moving map for the destination point specified in the travel path information, then the airport moving map optional function would be selected, possibly enabled, and possibly used in the vehicle prior to or upon arrival at the destination point.

In block 550E, determine if the destination point (at time of arrival) and/or the departure point (at time of departure) have noise abatement rules enforced that require vehicles to modify the engine power and vehicle trajectory when respectively arriving or departing. This information may be provided by the designer of the system or obtain remotely from an operations system. If yes, then in block 550F, determine if a requested time of a noise abatement system is an optional function that can be enabled, e.g. specified in the functions database 220A or the vehicle database 322A. The noise abatement system instructs, for example using the I/O(s) 224, the, e.g. pilot, to modify the vehicle trajectory and/or engine power as required at destination and/or departure points. If yes, then in block 440I, generate an enablement code the noise abatement system optional function, e.g. in the vehicle or flight management system.

In block 550G, determine if temperature(s) proximate in time and location along the vehicle trajectory will be below threshold level(s). Threshold levels may vary by location and time. The temperature can be obtained from the sources of weather information described above. The threshold level can be provided by the system user, system designer, or another source. If yes, then in block 550H, determine if a temperature compensation system is an optional function that can be enabled, e.g. specified in the functions database 220A or the vehicle database 322A. The temperature compensation system modifies the atmospheric pressure used by the instrument display system to indicate altitude, and by the travel, e.g. flight, management system to manage the vehicle's travel along the desired vehicle trajectory. If yes, then in block 440I, generate an enablement code for the temperature compensation system optional function, e.g. in the vehicle instrument display and/or travel management system.

In block 550J, determine if along the vehicle trajectory the, e.g. pilot, will have difficulty viewing his external surroundings (i.e. environment), e.g. due nighttime darkness or inclement weather such as rain, snow, clouds and/or fog. Determination of nighttime darkness can be ascertained from a system in the vehicle processing system, the service provider system, or an operating system. Weather information can be obtained from the sources described above. A synthetic vision system can be used to display a three dimensional rendering of the view that the pilot should otherwise be able to see. If yes, then in block 550K, determine if a requested time of a synthetic vision system is an optional function that can be enabled, e.g. specified in the functions database 220A or the vehicle database 322A. If yes, then in block 440I, generate an enablement code for the synthetic vision system optional function, e.g. which may be part of the instrument system.

The processing systems, e.g. the vehicle processing system 220 and/or the SPS processing system 332, disclosed herein can be implemented using software, firmware, hardware, or any appropriate combination thereof, as known to one of skill in the art. By way of example and not limitation, hardware components can be a computer and/or include one or more processors such as microprocessors, Digital Signal Processors (DSPs), microcontrollers, memory elements, interface cards, and other standard components known in the art. One or more specially-designed Application Specific Integrated Circuits (ASICs) and/or Field Programmable Gate Arrays (FPGAs) may be used in lieu of or in addition to the hardware components exemplified above. Memory elements may be implemented by one or more of the storage or memory media exemplified below. The processing systems described herein can also include functions with software programs, firmware, or other computer readable instructions for carrying out various process tasks, calculations, and control functions described herein.

The present method can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable media may include storage or memory media such as magnetic or optical media. For example, storage or memory media may include magnetic media (such as conventional hard disks), optical media (such as CDs, DVDs, and Blu-ray discs, and semiconductor memory (such as Random Access Memory (RAM) (including, but not limited to, Dynamic Random Access Memory (DRAM), Synchronous Dynamic Random Access Memory (SDRAM), Double Data Rate (DDR) RAM, RAMBUS Dynamic RAM (RDRAM), and Static RAM (SRAM)), Read Only Memory (ROM), Electrically Erasable Programmable ROM (EEPROM), and Flash memory). Combinations of the above are also included within the scope of computer readable media.

EXAMPLE EMBODIMENTS

Example 1 includes a method, comprising: receiving a travel plan for a vehicle including a travel path information; determining a vehicle trajectory using the travel path information; obtaining forecasts of at least one of weather and other vehicles proximate in time and location to the vehicle along the vehicle trajectory; determining, based upon at least one of the weather forecast and the other vehicles forecast, if at least one optional function would be beneficial to enable during vehicle travel along the vehicle trajectory; and generating at least one enablement code corresponding to the determined at least one optional function.

Example 2 includes the method of Example 1, wherein determining if the at least one optional function would be beneficial to enable based upon at least one of the weather forecast and the other vehicles forecast comprises at least one of: (a) determining if at least one of at least one other vehicle and severe weather will be proximate in time and location to the vehicle along the vehicle trajectory; (b) determining if the number of other vehicle(s) at the destination point when the vehicle arrives at the destination point, exceeds a threshold value; (c) determining if noise abatement rules are enforced in at least one of the departure point proximate to time of departure, and the destination point proximate to time of arrival; (d) determining if any temperatures, proximate in time and location to the vehicle on the vehicle trajectory, are below a threshold level; (e) determining if vehicle crew will have difficulty viewing the external environment due to at least one of time and weather conditions proximate to the location of the vehicle along the vehicle trajectory; and (f) determining if the vehicle is equipped with a moving map system for the destination point.

Example 3 includes the method of any of Examples 1-2, further comprising; transmitting, from the vehicle, confirmation data representative of at least one of at least one optional function enabled along the vehicle trajectory, and at least one optional function enabled and used along the vehicle trajectory; determining a fee based upon the at least one of the at least one optional function enabled along the vehicle trajectory, and the at least one optional function enabled and used along the vehicle trajectory; and transmitting an invoice for the fee.

Example 4 includes the method of any of Examples 1-3, further comprising extracting an identifier of the vehicle from the travel plan; and identifying at least one optional function on the vehicle based upon the vehicle identifier.

Example 5 includes the method of any of Examples 1-4, further comprising displaying determined at least one optional function; and receiving a selection of determined at least one optional function.

Example 6 includes the method of any of Examples 1-5, further comprising transmitting the at least one generated enablement code to the vehicle.

Example 7 includes the method of any of Examples 1-6, further comprising: enabling the determined at least one optional function at least one of (a) before departure from the destination point, and (b) along the vehicle trajectory; and disabling the determined at least one optional function at the conclusion of the vehicle trajectory.

Example 8 includes a method, comprising: receiving at least one enablement code at a vehicle; transmitting the at least one generated enablement code to at least one corresponding system of the vehicle; enabling the determined at least one optional function at least one of (a) before departure from the destination point, and (b) along a vehicle trajectory; and disabling the determined at least one optional function at the conclusion of the vehicle trajectory.

Example 9 includes the method of Example 8, further comprising; transmitting confirmation data representative of at least one of at least one optional function enabled along the vehicle trajectory, and at least one optional function enabled and used along the vehicle trajectory; determining a fee based upon the at least one of the at least one optional function enabled along the vehicle trajectory, and the at least one optional function enabled and used along the vehicle trajectory; and transmitting an invoice for the fee.

Example 10 includes the method of any of Examples 8-9, further comprising displaying determined at least one optional function; and receiving a selection of determined at least one optional function.

Example 11 includes a non-transitory computer readable medium storing a program causing a computer to execute a process to determine if at least one optional function should be enabled in a vehicle, the process comprising: receiving a travel plan for a vehicle including a travel path information; determining a vehicle trajectory using the travel path information; obtaining forecasts of at least one of weather and other vehicles proximate in time and location to the vehicle along the vehicle trajectory; determining, based upon at least one of the weather forecast and the other vehicles forecast, if at least one optional function would be beneficial to enable during vehicle travel along the vehicle trajectory; and generating at least one enablement code corresponding to the determined at least one optional function.

Example 12 includes the non-transitory computer readable medium of Example 11, wherein determining if the at least one optional function would be beneficial to enable based upon at least one of the weather forecast and the other vehicles forecast comprises at least one of: (a) determining if at least one of at least one other vehicle and severe weather will be proximate in time and location to the vehicle along the vehicle trajectory; (b) determining if the number of other vehicle(s) at the destination point when the vehicle arrives at the destination point, exceeds a threshold value; (c) determining if noise abatement rules are enforced in at least one of the departure point proximate to time of departure, and the destination point proximate to time of arrival; (d) determining if any temperatures, proximate in time and location to the vehicle along the vehicle trajectory, are below a threshold level; (e) determining if vehicle crew will have difficulty viewing the external environment due to at least one of time and weather conditions proximate to the location of the vehicle along the vehicle trajectory; and (f) determining if the vehicle is equipped with a moving map system for the destination point.

Example 13 includes the non-transitory computer readable medium of any of Examples 11-12, wherein the process further comprises; transmitting, from the vehicle, confirmation data representative of at least one of at least one optional function enabled along the vehicle trajectory, and at least one optional function enabled and used along the vehicle trajectory; determining a fee based upon the at least one of the at least one optional function enabled along the vehicle trajectory, and the at least one optional function enabled and used along the vehicle trajectory; and transmitting an invoice for the fee.

Example 14 includes the non-transitory computer readable medium of any of Examples 11-13, wherein the process further comprises extracting an identifier of the vehicle from the travel plan; and identifying at least one optional function on the vehicle based upon the vehicle identifier.

Example 15 includes the non-transitory computer readable medium of any of Examples 11-14, wherein the process further comprises displaying determined at least one optional function; and receiving a selection of determined at least one optional function.

Example 16 includes the non-transitory computer readable medium of any of Examples 11-15, wherein the process further comprises transmitting the at least one generated enablement code to the vehicle.

Example 17 includes the non-transitory computer readable medium of any of Examples 11-16, wherein the process further comprises: transmitting the at least one generated enablement code to at least one corresponding system of the vehicle; enabling the determined at least one optional function at least one of (a) before departure from the destination point, and (b) during the vehicle trajectory; and disabling the determined at least one optional function at the conclusion of the vehicle trajectory.

Example 18 includes a non-transitory computer readable medium storing a program causing a computer to execute a process to enable at least one optional function in a vehicle, the process comprising: receiving at least one enablement code at a vehicle; transmitting the at least one generated enablement code to at least one corresponding system of the vehicle; enabling the determined at least one optional function at least one of (a) before departure from the destination point, and (b) during a vehicle trajectory; and disabling the determined at least one optional function at the conclusion of the vehicle trajectory.

Example 19 includes the non-transitory computer readable medium of Example 18, wherein the process further comprises; transmitting confirmation data representative of at least one of at least one optional function enabled along the vehicle trajectory, and at least one optional function enabled and used along the vehicle trajectory; determining a fee based upon the at least one of the at least one optional function enabled along the vehicle trajectory, and the at least one optional function enabled and used along the vehicle trajectory; and transmitting an invoice for the fee.

Example 20 includes the non-transitory computer readable medium of any of Examples 18-19, wherein the process further comprises displaying determined at least one optional function; and receiving a selection of determined at least one optional function.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method, comprising:
   receiving a travel plan for a vehicle including a travel path information;
   determining a vehicle trajectory using the travel path information;
   obtaining forecasts of at least one of weather and other vehicles proximate in time and location to the vehicle along the vehicle trajectory;
   determining, based upon at least one of the weather forecast and the other vehicles forecast, if at least one optional function would be beneficial to enable during vehicle travel along the vehicle trajectory; and
   generating at least one enablement code corresponding to the determined at least one optional function.

2. The method of claim 1, wherein determining if the at least one optional function would be beneficial to enable based upon at least one of the weather forecast and the other vehicles forecast comprises at least one of:
   (a) determining if at least one of at least one other vehicle and severe weather will be proximate in time and location to the vehicle along the vehicle trajectory;
   (b) determining if a number of other vehicle(s) at a destination point when the vehicle arrives at the destination point, exceeds a threshold value;
   (c) determining if noise abatement rules are enforced in at least one of a departure point proximate to a time of departure, and the destination point proximate to a time of arrival;
   (d) determining if any temperatures, proximate in time and location to the vehicle on the vehicle trajectory, are below a threshold level;
   (e) determining if vehicle crew will have difficulty viewing an external environment due to at least one of time and weather conditions proximate to the location of the vehicle along the vehicle trajectory; and
   (f) determining if the vehicle is equipped with a moving map system for the destination point.

3. The method of claim 1, further comprising:
   transmitting, from the vehicle, confirmation data representative of at least one of at least one optional function enabled along the vehicle trajectory, and at least one optional function enabled and used along the vehicle trajectory;
   determining a fee based upon the at least one of the at least one optional function enabled along the vehicle trajectory, and the at least one optional function enabled and used along the vehicle trajectory; and
   transmitting an invoice for the fee.

4. The method of claim 1, further comprising extracting an identifier of the vehicle from the travel plan; and
   identifying at least one optional function on the vehicle based upon the identifier.

5. The method of claim 1, further comprising displaying the determined at least one optional function; and
   receiving a selection of the determined at least one optional function.

6. The method of claim 1, further comprising transmitting the at least one generated enablement code to the vehicle.

7. The method of claim 1, further comprising:
   enabling the determined at least one optional function at least one of (a) before departure from a destination point, and (b) along the vehicle trajectory; and
   disabling the determined at least one optional function at a conclusion of the vehicle trajectory.

8. A method, comprising:
   receiving at least one enablement code at a vehicle;
   transmitting the at least one enablement code to at least one corresponding system of the vehicle;
   enabling at least one optional function corresponding to the at least one enablement code at least one of (a) before departure from a destination point, and (b) along a vehicle trajectory; and
   disabling the at least one optional function at a conclusion of the vehicle trajectory.

9. The method of claim 8, further comprising;
   transmitting confirmation data representative of at least one of at least one optional function enabled along the vehicle trajectory, and at least one optional function enabled and used along the vehicle trajectory;
   determining a fee based upon the at least one of the at least one optional function enabled along the vehicle trajectory, and the at least one optional function enabled and used along the vehicle trajectory; and
   transmitting an invoice for the fee.

10. The method of claim 8, further comprising displaying the at least one optional function; and
    receiving a selection of the at least one optional function.

11. A non-transitory computer readable medium storing a program causing a computer to execute a process to determine if at least one optional function should be enabled in a vehicle, the process comprising:
    receiving a travel plan for a vehicle including a travel path information;
    determining a vehicle trajectory using the travel path information;
    obtaining forecasts of at least one of weather and the other vehicles proximate in time and location to the vehicle along the vehicle trajectory;

determining, based upon at least one of the weather forecast and other vehicles forecast, if at least one optional function would be beneficial to enable during vehicle travel along the vehicle trajectory; and generating at least one enablement code corresponding to the determined at least one optional function.

12. The non-transitory computer readable medium of claim 11, wherein determining if the at least one optional function would be beneficial to enable based upon at least one of the weather forecast and the other vehicles forecast comprises at least one of:

(a) determining if at least one of at least one other vehicle and severe weather will be proximate in time and location to the vehicle along the vehicle trajectory;

(b) determining if a number of other vehicle(s) at a destination point when the vehicle arrives at the destination point, exceeds a threshold value;

(c) determining if noise abatement rules are enforced in at least one of a departure point proximate to a time of departure, and the destination point proximate to a time of arrival;

(d) determining if any temperatures, proximate in time and location to the vehicle along the vehicle trajectory, are below a threshold level;

(e) determining if vehicle crew will have difficulty viewing an external environment due to at least one of time and weather conditions proximate to the location of the vehicle along the vehicle trajectory; and (f) determining if the vehicle is equipped with a moving map system for the destination point.

13. The non-transitory computer readable medium of claim 11, wherein the process further comprises;

transmitting, from the vehicle, confirmation data representative of at least one of at least one optional function enabled along the vehicle trajectory, and at least one optional function enabled and used along the vehicle trajectory;

determining a fee based upon the at least one of the at least one optional function enabled along the vehicle trajectory, and the at least one optional function enabled and used along the vehicle trajectory; and transmitting an invoice for the fee.

14. The non-transitory computer readable medium of claim 11, wherein the process further comprises extracting an identifier of the vehicle from the travel plan; and identifying at least one optional function on the vehicle based upon the identifier.

15. The non-transitory computer readable medium of claim 11, wherein the process further comprises displaying the determined at least one optional function; and receiving a selection of the determined at least one optional function.

16. The non-transitory computer readable medium of claim 11, wherein the process further comprising transmitting the at least one generated enablement code to the vehicle.

17. The non-transitory computer readable medium of claim 11, wherein the process further comprises:

transmitting the at least one generated enablement code to at least one corresponding system of the vehicle;

enabling the determined at least one optional function at least one of (a) before departure from a destination point, and (b) during the vehicle trajectory; and disabling the determined at least one optional function at a conclusion of the vehicle trajectory.

18. A non-transitory computer readable medium storing a program causing a computer to execute a process to enable at least one optional function in a vehicle, the process comprising:

receiving at least one enablement code at a vehicle;

transmitting the at least one enablement code to at least one corresponding system of the vehicle;

enabling at least one optional function corresponding to the at least one enablement code at least one of (a) before departure from a destination point, and (b) during a vehicle trajectory; and disabling the at least one optional function at a conclusion of the vehicle trajectory.

19. The non-transitory computer readable medium of claim 18, wherein the process further comprises;

transmitting confirmation data representative of at least one of at least one optional function enabled along the vehicle trajectory, and at least one optional function enabled and used along the vehicle trajectory;

determining a fee based upon the at least one of the at least one optional function enabled along the vehicle trajectory, and the at least one optional function enabled and used along the vehicle trajectory; and transmitting an invoice for the fee.

20. The non-transitory computer readable medium of claim 18, wherein the process further comprises displaying the at least one optional function; and receiving a selection of the at least one optional function.

* * * * *